Jan. 20, 1953  G. M. STEIN  2,625,821
MEASUREMENT OF ELECTRICAL WINDING TEMPERATURES
Filed Oct. 14, 1949
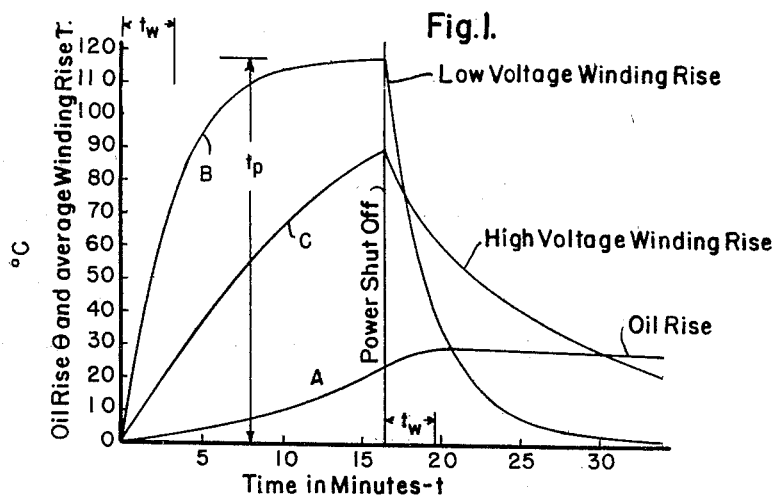
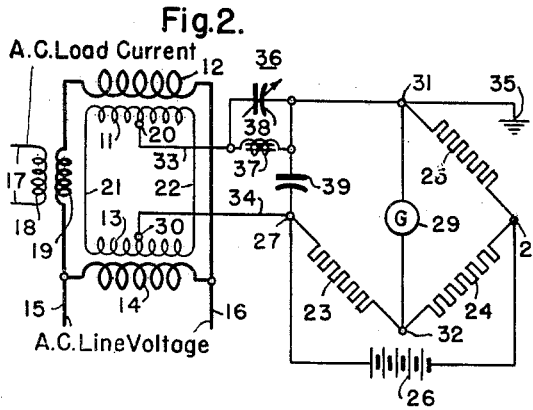
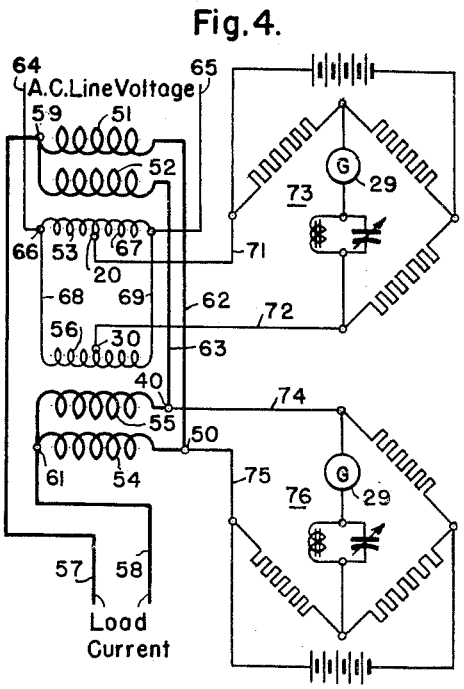
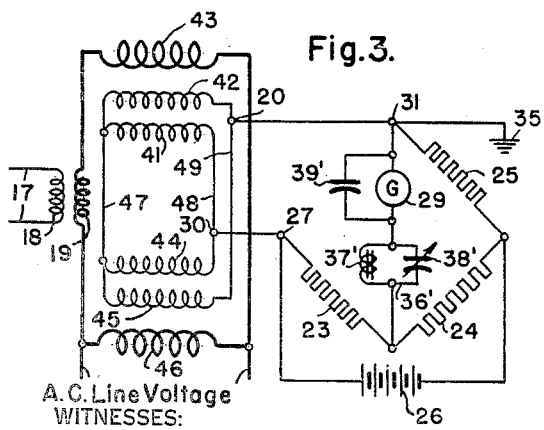
INVENTOR
Gerhard M. Stein.
BY
Franklin E. Hardy
ATTORNEY Jan. 20, 1953 G. M. STEIN 2,625,821
MEASUREMENT OF ELECTRICAL WINDING TEMPERATURES
Filed Oct. 14, 1949 3 Sheets-Sheet 2
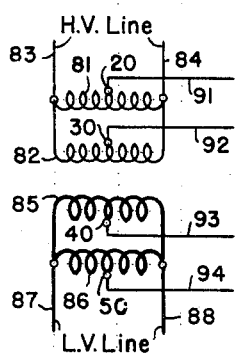
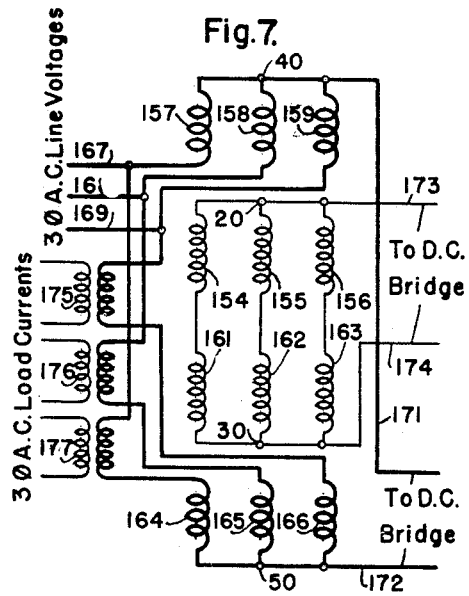
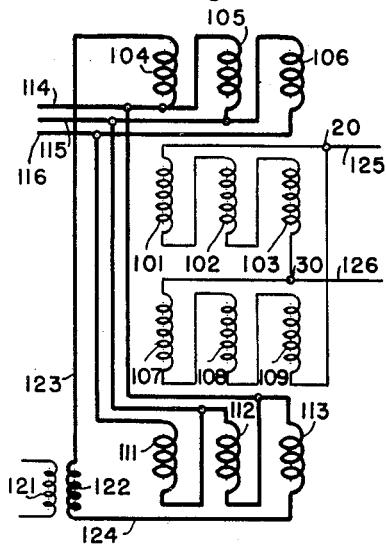
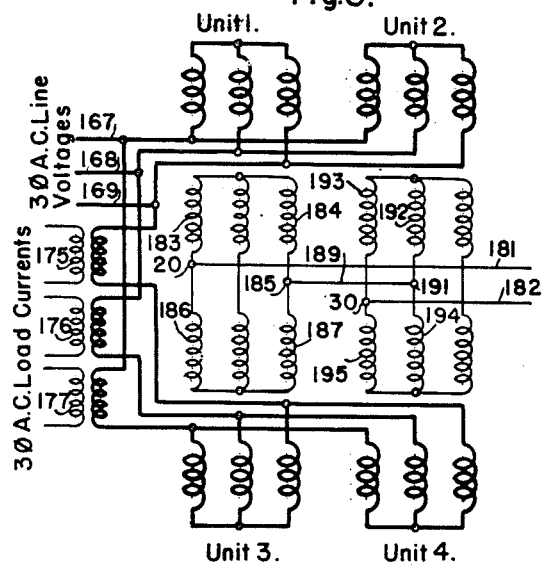
INVENTOR
Gerhard M. Stein.
BY
Franklin E. Hardy
ATTORNEY Jan. 20, 1953  G. M. STEIN  2,625,821
MEASUREMENT OF ELECTRICAL WINDING TEMPERATURES
Filed Oct. 14, 1949  3 Sheets-Sheet 3
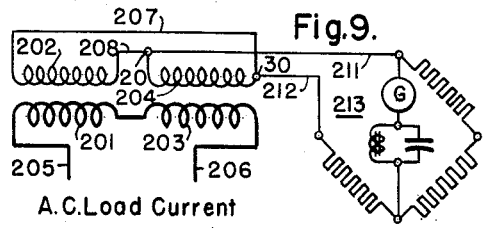
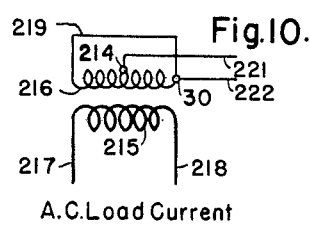
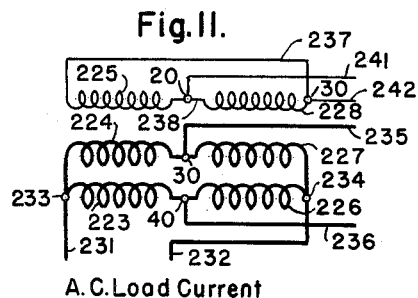
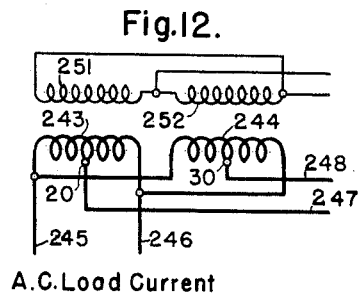
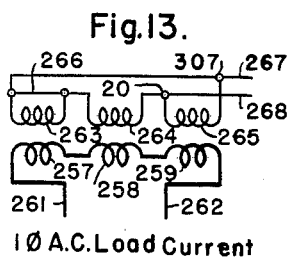
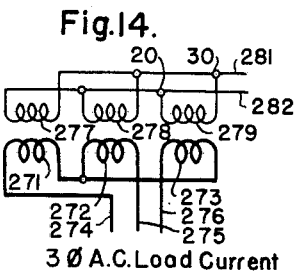
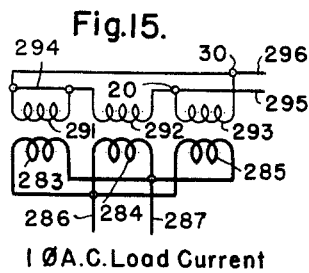
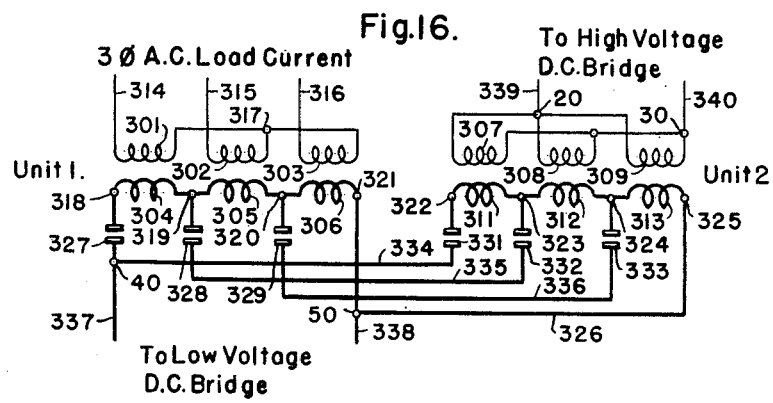
WITNESSES:
INVENTOR
Gerhard M. Stein.
BY
ATTORNEY Patented Jan. 20, 1953

2,625,821

UNITED STATES PATENT OFFICE 2,625,821

MEASUREMENT OF ELECTRICAL WINDING TEMPERATURES

Gerhard M. Stein, Sharon, Pa., assignor to Westinghouse Electric Corporation, East Pittsburgh, Pa., a corporation of Pennsylvania Application October 14, 1949, Serial No. 121,408

14 Claims. (Cl. 73—350)

This invention relates to a method of and means for measuring the temperatures of the windings of electrical apparatus such as transformers, with the apparatus carrying load current.

Conventional standards of transformer operation impose only one restriction on the temperatures in the transformer windings, namely, that the average rise in temperature above ambient temperature shall not exceed a specific amount, usually 55° C. under continuous operating conditions at rated load. Consequently, the only temperature test commonly made demonstrates whether this requirement has been met.

It is customary to measure the transformer winding temperatures by the resistance test method. It is known that the resistance of copper conductors changes with changes in temperature. Normally, such a resistance test cannot be made while the windings carry alternating current load. The standard rules for making such tests permit the tests to be taken within a short time interval after shutdown of the alternating current load and interpolate the drop in temperature of the winding between the time of shut down and the time of making the test in accordance with curves showing the probable rate of cooling. If, therefore, after the apparatus has been in operation and it is desired to measure the copper temperature, the load is shut off and metering circuits are connected to the winding terminals and a known direct current voltage impressed thereon, the measurement of current through the winding in known manner may be used to determine the transformer winding temperature. Under normal conditions, the winding temperatures are low and thermal equilibrium is reached before readings are taken, so that a resistance test obtained within a reasonably short time after shutdown usually gives sufficiently accurate results for commercial purposes.

Conventional resistance tests are not sufficiently accurate for the measurement of the temperature of transformer windings subject to heating transients when high temperature or rapidly changing temperatures are involved because the amount of cooling that takes place between shutting off the power and the temperature reading by the resistance measurement is long enough to allow an appreciable error and does not follow the time cooling curves normally used.

In accordance with the invention, method and means are provided for making continuous measurements of the temperature of electrical windings while operating under load conditions of the apparatus and which can be applied in general to such apparatus as transformers, motors and similar apparatus.

In accordance with the invention, the resistance of the windings under test is measured with direct current by using a Wheatstone bridge while alternating current is flowing through the windings under test. The resistance must be measured between two points on the windings under test having substantially the same alternating current potential so that no damaging alternating current excitation will enter the direct current instrument.

The invention is applicable to all types of electrical windings. Since, however, transformer connections are similar in principle to other winding connections of electrical apparatus, the invention will be described with respect to transformer windings only.

The invention will be better understood, and other objects and advantages thereof will be apparent from the following description of certain preferred embodiments thereof, reference being made to the accompanying drawings, in which:

Figure 1 is a diagram showing heating and cooling curves of the transformer oil, the low voltage winding, and the high voltage winding of a transformer over a period of time during which a predetermined overload is applied and then interrupted;

Fig. 2 is a diagrammatic view of circuits and apparatus connected in accordance with my invention for measuring the temperature of the high voltage windings of two similar single-phase transformer units through which load current is flowing;

Fig. 3 is a diagrammatic view of circuits and apparatus for measuring the temperature of the high voltage windings of two single-phase transformer units where two equal parallel sections are provided in the high voltage windings of each unit;

Fig. 4 is a diagrammatic view of circuits and apparatus for simultaneously measuring the high voltage and low voltage winding temperatures in two single-phase transformers while load current and line voltage are applied;

Fig. 5 is a diagrammatic view of circuits for simultaneously measuring the high voltage and low voltage winding temperatures of a single-phase transformer where each winding has two similar sections. This measurement may be made while the transformer is in service.

Fig. 6 is a diagrammatic view of circuits for measuring the high voltage winding temperatures and the low voltage winding temperatures in delta-delta connected three-phase transformers under load current and line voltage;

Fig. 7 is a diagrammatic view of circuits for simultaneously measuring the temperature of the high voltage and low voltage windings under load current of two three-phase Y-Y connected transformers with accessible neutrals;

Fig. 8 is a diagrammatic view of circuits for simultaneously measuring two high voltage phase windings under load current of two three-phase Y-Y connected transformers with inaccessible neutrals;

Fig. 9 is a diagrammatic view of circuits connected for measuring the temperature of the high voltage windings of two similar single-phase transformer units under load current without line voltage being applied;

Fig. 10 is a diagrammatic view of circuits connected for measuring the temperature of the high voltage windings of one single-phase transformer unit under load current without line voltage being applied, if a midtap is available in the high voltage winding;

Fig. 11 is a diagrammatic view of circuits for simultaneously measuring the temperature of the high voltage and low voltage windings under load current of two single-phase transformer units with two parallel low voltage winding sections, without the application of line voltage;

Fig. 12 is a diagrammatic view of circuits for simultaneously measuring the temperature of the high voltage and low voltage windings of two similar single-phase transformer units with two parallel low voltage winding sections, the measurement being made while load current is flowing but without the application of line voltage;

Fig. 13 is a diagrammatic view of circuits for measuring the temperature of the high voltage windings of a delta-delta connected three-phase transformer under load current without line voltage;

Fig. 14 is a diagrammatic view of circuits for measuring the temperature of the high voltage winding in Y-Y connected three-phase transformers under load current without line voltage;

Fig. 15 is a diagrammatic view of circuits for measuring the high voltage winding temperatures in delta-Y connected three-phase transformers under load current without line voltage being applied where the transformer is provided with accessible neutrals; and Fig. 16 is a diagrammatic view of circuits for the simultaneous measuring of the temperatures of the high voltage and low voltage windings of two Y-delta connected three-phase transformers with load current but not line voltage applied, and with the units being protected by circuit breakers in the low voltage line.

In accordance with rules of the American Institute of Electrical Engineers and the American Standard Association, three methods are recognized for testing the temperatures of apparatus windings by measuring the change in resistance of the winding conductors. In each method, the rise in temperature is determined by one or more measurements after shutdown. The difference between the three methods is in the manner of determining the correction to be applied to determine the drop in temperature between the time of shutdown of the apparatus and the time of taking the measurement.

One of these methods requires that a correction of 1° C. be added to the measured temperature value for each minute elapsed between the time of shutdown and the time of taking the measurement. This method is used where the winding losses do not exceed 7 watts per pound.

A second method is used where the losses are between 7 watts per pound and 30 watts per pound. This method uses a variable correction which depends on the time between shutdown and test.

A third method is recommended where the losses are above 30 watts per pound and requires the measurement of the lower part of a cooling curve by a series of readings whose extrapolation furnishes the temperature at shutdown. Such a cooling curve must be extrapolated back to the time of shutdown in order to find the winding temperatures under load.

In certain oil cooled transformers, operating under heavy overload, and in some dry-type transformers, the specific winding losses are so large that a cooling curve must be taken for the test of their winding temperatures. If the corresponding temperature rise of the winding over the surrounding medium is in the neighborhood of 100° C. or higher, the winding temperature may drop at a rate of from 10 to 50 degrees centigrade per minute after the current is interrupted. Under these conditions it becomes quite difficult to extrapolate such a cooling curve back to the moment of shutdown with a reasonable degree of accuracy. In order to get reliable data of the highest temperature reached in such windings, it is necessary to test the temperature time curve during the heating period of the winding which cannot be done with available methods.

In accordance with the present invention, the resistance of the winding under test is measured while the transformer is carrying its alternating current load so that no shutdown of this load is necessary. The resistance of the winding under test must be measured between two points in the windings which are substantially at the same alternating current potential. If this is done with direct current using a Wheatstone bridge, no damaging alternating current excitation will enter the direct current instruments.

Referring to Fig. 1, the curve A shows the rate of rise of the oil temperature, the curve B shows the rate of rise and cooling of the low voltage winding temperature, and the curve C shows the rate of rise and cooling of the high voltage winding temperature above the ambient temperature of a transformer. The conditions represented by the curves in Fig. 1 are the application of a 400% load in a small single-phase distribution transformer applied for a time of about 16½ minutes at which time the power is shut off. It will be noted that at the time of power shutoff the low voltage winding curve has begun to level off, that is, to approach a constant value it will eventually attain at that load, while the temperature of the high voltage winding is still rising rather rapidly. The temperature of the oil has risen comparatively slowly during the time the power is on the transformer and continues to rise for a certain time after power shutoff due to the exchange of heat from the windings to the oil. It will also be noted that upon power shutoff, the low voltage winding temperature decreases rapidly, and the high voltage winding temperature decreases less rapidly, the windings giving up their heat to the oil.

Fig. 2 illustrates an application of the invention to the testing of two transformer units, one unit having a high voltage winding 11 and a low voltage winding 12, and the other unit having a high voltage winding 13 and a low voltage winding 14. The low voltage windings 12 and 14 are connected to be excited in parallel circuit relation from the alternating current conductors 15 and 16, applying line voltage to the windings, while load current is circulated through them in series from the transformer 17 having windings 18 and 19. The high voltage windings 11 and 13 are connected together at their ends through conductors 21 and 22 so that taps from the mid-points 20 and 30 of these windings will have the same alternating current potential. Thus the resistance between these tap points, as terminals can be measured with a direct current Wheatstone bridge connected to these mid-points without damaging alternating current flowing through the bridge. The resistance measured is that of the two parallel connected paths between the points 20 and 30, each path including half of the high voltage windings 11 and 13 of the two transformer units.

It will be noted that the mid-points 20 and 30 of the closed circuit including the two windings 11 and 13, which serve as direct current terminals for the direct current test circuit are located at points on the windings having equal alternating current potentials. It will also be noted that the same direct current potentials appear at the conductors 21 and 22 connecting the ends of the windings 11 and 13.

The Wheatstone bridge includes three resistors 23, 24 and 25 connected to form three of the four sides of the bridge, the fourth side comprising the windings, the temperatures of which are to be measured, connected between the midtap points 20 and 30. A battery or direct current source 26 is provided connected across the two diagonally opposite terminal points of the bridge 27 and 28, and a measuring instrument or galvanometer 29 is provided connected across the two remaining diagonally opposite points of the bridge 31 and 32. The midtap points 20 and 30 are connected, respectively, by means of conductors 33 and 34 to the points 31 and 27 of the bridge circuit.

For further protection of the bridge circuit, one terminal 31 of the galvanometer 29 should be grounded, as shown at 35. Also, it should be noted that, due to manufacturing limitations, the alternating current voltage between the points 20 and 30 will not ordinarily be completely zero so that a small alternating current may flow to the bridge between these points. In order to protect the bridge against this alternating current excitation, a filter circuit 36 may be inserted between the transformer being tested and the bridge. This filter 36 may consist of an iron core reactor 37 connected in parallel with a capacitor 38. In some cases, the reactor 37 alone may be desirable. A capacitor 39 may be connected in parallel with the bridge circuit to further reduce any alternating current flowing therethrough. In some cases, the capacitor 39 may be used without the filter 36, and in some cases neither may be required.

If the alternating current flowing to the bridge, unprotected by either a filter 36 or condenser 39, is sufficiently small so that it does not overheat the bridge resistances 23, 24 and 25, it may be permitted to circulate through these resistances since it does not disturb the direct current balance of the bridge circuit. Then only the galvanometer 29 may require protection against alternating current excitation. For this purpose a filter 36' may be connected in series with the galvanometer 29, and a condenser 39' may be connected in parallel relation therewith, as shown in Fig. 3, or one only of these two devices may be used, or only a series reactor 37' may be used in place of the complete filter circuit 36.

In Fig. 3, the transformers being tested comprise two units, one unit having two equal parallel high voltage winding sections 41 and 42 and a low voltage winding 43, and the other unit having two equal parallel high voltage winding sections 44 and 45 and a low voltage winding 46. Where the high voltage winding of two similar transformers includes two equal parallel sections 41 and 42, and 44 and 45, one section of each unit may be connected in series with a section of the other units and both circuits thus obtained joined in parallel, so that their mid-points 20 and 30 are at the same alternating current potential for the direct current measurement tests. This is accomplished by connecting one end of all four sections together by the conductor 47, and connecting the opposite ends of sections 41 and 44 together by conductor 48 and the remaining ends of sections 42 and 45 together by the conductor 49, thus providing the points 20 and 30 of equal alternating current potential on the conductors 48 and 49.

In another application of the invention shown in Fig. 4, two transformer units are connected together for simultaneously measuring the temperatures of both the high voltage winding and the low voltage winding while under load current. As shown in Fig. 4, one transformer unit comprises two similar low voltage winding sections 51 and 52 and a high voltage winding 53, and the other transformer unit comprises two similar low voltage winding sections 54 and 55 and a high voltage winding 56. Load current is applied through conductors 57 and 58, which are connected to junction points 59 and 61, respectively, through which parallel circuits extend. One of these parallel circuits includes the low voltage winding section 51, conductor 62, and the low voltage winding section 54, and the other of these two parallel circuits includes the winding section 52, conductor 63, and the winding section 55. Alternating current line voltage is applied from conductors 64 and 65 to junction points 66 and 67 connected across the ends of both high voltage windings 53 and 56, which are connected together at their ends through conductors 68 and 69. Midtap points 20 and 30 on the high voltage windings 53 and 56, respectively, are connected by conductors 71 and 72 to a high voltage direct current bridge 73 that is similar to that above described. Similarly, equal potential points 40 and 50 in the two parallel circuits, including the low voltage winding sections 51, 52, 53 and 54, are connected through conductors 74 and 75 to a low voltage direct current bridge 76, which likewise is similar to those above described.

It will be noted that, not only are the direct current terminals of the windings being tested on points having substantially the same alternating current potential but, also, the alternating current terminals are at points having substantially the same direct current potential.

For example, in Fig. 4, the mid points 40 and 50 of the two low voltage winding circuits and midtaps 20 and 30 of the two high voltage windings will be at equal alternating current potentials for the direct current test. Also, the same direct current potentials appear at the alternating current supply terminals 66 and 67 as well as at the alternating current terminals 59 and 61.

Fig. 5 shows a connection for testing high voltage and low voltage winding temperatures of a single-phase transformer unit while the transformer is connected in service on a distribution line. The unit is shown provided with two high voltage windings 81 and 82 connected in parallel circuit relation to line conductors 83 and 84, and two low voltage windings 85 and 86 shown connected in parallel to low voltage line conductors 87 and 88. The high voltage windings are provided with midtap points 20 and 30 connected by conductors 91 and 92 to a high voltage direct current bridge, and the low voltage windings are provided with midtap points 40 and 50 connected by conductors 93 and 94 to a low voltage direct current bridge circuit.

Fig. 6 shows a circuit for temperature testing the high voltage windings in delta-delta connected three-phase transformers under load current and line voltage excitation. The circuit shows two three-phase transformers, the one having high voltage windings 101, 102 and 103 and low voltage windings 104, 105 and 106. The other unit is provided with high voltage windings 107, 108 and 109 and low voltage windings 111, 112 and 113. The low voltage windings are excited with three-phase line voltages from conductors 114, 115 and 116. The low voltage windings of the two units are excited in parallel from the three-phase voltage supply while single-phase load current is supplied thereto through the transformer 121 having a secondary winding 122 connected by circuit conductors 123 and 124 to flow in series through the six low voltage windings of the two transformer units connected in delta-delta relation in each unit. The high voltage windings of the two units are connected together in the same manner as shown in Figs. 4 and 5, providing points 20 and 30 having the same alternating current potential and which are connected through conductors 125 and 126 to a direct current bridge for measuring the winding temperature.

Fig. 7 illustrates circuits for simultaneously measuring the temperatures of the high voltage and low voltage windings of two three-phase transformer units connected in Y—Y, which may be used where the transformers are provided with accessible neutral points. One transformer unit includes the three high voltage windings 154, 155 and 156, and the three low voltage windings 157, 158 and 159, and the other unit includes the high voltage windings 161, 162 and 163, and the low voltage windings 164, 165 and 166. The low voltage windings of the two transformer units are excited in parallel circuit relation from the three-phase alternating current supply conductors 167, 168 and 169, and the neutral points 49 and 50 will have the same alternating current potential for the direct current measurement, thus constituting the points from which conductors 171 and 172 lead to the direct current bridge circuit for the low voltage windings. The corresponding high voltage terminals of each unit are connected together to form points 20 and 30 from which conductors 173 and 174 lead to the direct current bridge circuit for the high voltage winding. The points 20 and 30 are the neutral points of the two high voltage windings and the corresponding phase windings in the two transformer units are connected in series with each other in each of the three phases between these points. Three-phase load currents are provided through transformers 175, 176 and 177, respectively. In order to obtain accurate results with this circuit it is necessary that the resistances of the secondary windings of the transformers 175, 176 and 177 be subtracted from the test results.

If the neutrals of similar Y-Y connected transformers are not available, four units may be used, connected as shown in Fig. 8, for temperature testing two high voltage phase windings. All low voltage windings of the four units are excited in parallel from three phase conductors 167, 168 and 169 in the same manner, as shown in Fig. 7, and three-phase load currents are circulated through these low voltage windings from transformers 175, 176 and 177 in a manner similar to that shown in Fig. 7 except that there are four sets of windings instead of two sets. If, in addition to this, corresponding high voltage phase windings are connected together in the same manner as shown in Fig. 7, except that there are four units to be connected instead of two units, the equipotential points 20 and 30 to be connected to the direct current bridge through conductors 181 and 182 may be chosen, as shown in the drawings. The direct current circuit between points 20 and 30 will be as follows: from point 20 through phase windings 183 and 184 in series to junction point 185 and through a parallel circuit between points 20 and 185, including phase windings 186 and 187, from junction point 185 through conductor 189 to junction point 191 and through two parallel paths, the one including phase windings 192 and 193 and the other including the phase windings 194 and 195 to the junction point 30.

In case the low voltage windings are to be temperature tested, the four transformer units will be connected in a manner similar to that shown in Fig. 8 except that the four transformers will be excited from the high voltage winding instead of from the low voltage winding. That is, the high voltage windings of the four units will be connected in the manner shown in Fig. 8 for the low voltage windings, and the low voltage windings will be connected as shown for the high voltage windings.

The circuits arranged in accordance with the invention for testing winding temperatures under load can be considerably simplified if the transformer units are not excited at line voltage but are supplied only with load currents. Tests made under these conditions will give a satisfactory result since in heavy overloads the losses resulting from line voltage, that is, the iron losses in the core, are small as compared with the copper losses in the coils and they have little influence on the winding temperatures.

Without line voltages, two single-phase transformer units may be connected for tests of the high voltage winding temperatures as shown in Fig. 9. One transformer of these two units includes the low voltage winding 201 and the high voltage winding 202, and the other unit includes the low voltage winding 203 and the high voltage winding 204. As shown in Fig. 9, the two low voltage windings 201 and 203 are excited in series from conductors 205 and 206, and the two high voltage windings are connected in a short-circuited loop through conductors 207 and 208. The points 20 and 30 constituting the high voltage terminals of the two transformers will then be at the same alternating current potential so that no high voltage midtaps are required, and these equipotential points are connected by conductors 211 and 212 to the direct current bridge 213 and the high voltage winding temperatures measured in the manner above described.

If a transformer is provided with a midtap 214, as shown in Fig. 10, a single transformer unit comprising the low voltage winding 215 and high voltage winding 216 may be temperature tested without being connected to a second unit. The alternating load current is supplied through conductors 217 and 218 to the low voltage winding 215 and the high voltage winding 216 is short-circuited through conductor 219, so that the midtap point 214 and the winding terminal 30 become points of equipotential in the alternating current circuit and may be connected through conductors 221 and 222 to the direct current bridge.

In a simultaneous test of high voltage and low voltage windings, if the line voltage excitation is omitted, the circuit of Fig. 4 may be simplified, as shown in Fig. 11, providing the transformer units are provided with two parallel low voltage sections. As shown in Fig. 11, two units are connected, one unit having low voltage winding sections 223 and 224 and a high voltage winding 225, and the other unit having two low voltage winding sections 226 and 227 and a high voltage winding 228. Load current is provided through conductors 231 and 232 and flows through two parallel paths between junction points 233 and 234, one path including the winding sections 223 and 226, and the other path including the winding sections 224 and 227. Thus, junction points 30 and 40 midway along these two parallel paths provide points having the same alternating current potential which are connected by conductors 235 and 236 to a direct current bridge for measuring the temperature of the low voltage windings. The high voltage windings 225 and 228 are connected in a short-circuited loop by conductors 237 and 238 providing junction points 20 and 30 similar to those shown in Fig. 9, which are connected by means of conductors 241 and 242 to a direct current bridge for measuring the temperature of the high voltage windings.

In a simultaneous temperature test of the high voltage and low voltage windings, where there are no parallel connected low voltage sections, but only a single winding, the transformer may be tested by the connection shown in Fig. 12, using midtaps on the two low voltage windings. In this case, the low voltage windings 243 and 244 are energized in parallel circuit relation from the conductors 245 and 246, and midtaps 20 and 30 on the two windings are used as the points having equal alternating current potential, and are connected by means of conductors 247 and 248 to the direct current low voltage bridge. The high voltage windings 251 and 252 are connected in the same manner as shown in Fig. 11 and require no further description.

Figs. 13, 14 and 15 illustrate examples of how the invention may be applied to a temperature test of individual three-phase units under load when only one side of the transformer (either the high voltage windings or the low voltage windings) are measured at a time. In Fig. 13, the three low voltage windings 257, 258 and 259 are connected in delta and supplied with single-phase load current from conductors 261 and 262. The transformer unit is provided with three delta-connected high voltage windings 263, 264 and 265. The phase winding 263 is shown short-circuited by conductor 266, and the remaining two high voltage phase windings are connected in the same manner shown in Fig. 9, providing points 20 and 30 having equal alternating current potential connected to the bridge circuit by conductors 267 and 268.

In Fig. 14, the windings are in Y—Y connection having accessible neutrals. The three low voltage windings 271, 272 and 273 are supplied with three-phase load current through conductors 274, 275 and 276. The three high voltage windings 277, 278 and 279 are connected in parallel circuit relation between points 20 and 30 and through conductors 281 and 282 to the direct current bridge.

In Fig. 15, the three low voltage windings 283, 284 and 285 are connected in parallel and excited by a single-phase alternating current load current through conductors 286 and 287. The three high voltage windings 291, 292 and 293 are connected in the manner shown in Fig. 13, the winding 291 being short-circuited by the conductor 294 and the junction points 20 and 30 being connected by conductors 295 and 296 to a direct current bridge circuit.

Fig. 16 shows a circuit arrangement for simultaneously measuring the high voltage and low voltage winding temperatures of two Y-delta connected three-phase transformers under load and without line voltage.

Transformers containing circuit breakers present a special problem in temperature measurements at short-time overloads, because such loads are interrupted by these circuit breakers in order to prevent overheating of the windings. For insuring proper circuit breaker operation, the same current must flow through each circuit in the test as under actual service conditions. If, for example, the breakers are normally placed in the low-voltage line leads of a delta-delta connected three-phase transformer single-phase load current should not be circulated through the windings, since such a current would bypass the circuit breakers. Furthermore, in a test of several units, the load current has to be interrupted everywhere if the circuit breaker trips in one unit only.

A typical example of a circuit complying with these requirements is shown in Fig. 16 for the simultaneous temperature testing of the high voltage and low voltage windings of two Y-delta connected three-phase transformers without line voltage.

In Fig. 16 two transformer units are shown, unit No. 1 having three high voltage windings 301, 302 and 303, and three low voltage windings 304, 305 and 306, and unit No. 2 having three high voltage windings 307, 308 and 309, and three low voltage windings 311, 312 and 313. The high voltage windings of transformer unit No. 1 are connected to a three-phase alternating current circuit by conductors 314, 315 and 316 through which three-phase load current is supplied to the transformer. The high voltage windings 301, 302 and 303 are connected to a neutral point 317 forming a Y connection of the three windings. The low voltage windings 304, 305 and 306 are connected in series or delta relation as shown, and terminals 318, 319, 320 and 321 thereof are connected, respectively, to corresponding terminals 322, 323, 324 and 325 of the low voltage windings 311, 312 and 313 of the transformer unit No. 2. The three terminals 318, 319 and 320 of transformer unit No. 1 are connected, respectively through the three poles 327, 328 and 329 of a three pole circuit breaker of transformer unit No. 1, and through conductors 334, 335 and 336 to the three poles 331, 332 and 333 of a three pole circuit breaker of transformer unit No. 2 to terminals 322, 323 and 324 of the low voltage windings of unit No. 2. The fourth terminal 321 of unit No. 1 is connected by conductor 326 to the fourth terminal 325 of unit No. 2 without including a pole of the circuit breaker of either transformer unit. It will be appreciated that in each unit the three poles of the circuit breaker are interconnected to operate together so that all three poles operate to open at the same time and to close at the same time.

In order to let either circuit breaker interrupt the load currents of both units, they are loaded in cascade formation; that is, three-phase currents are supplied to the high-voltage side of unit No. 1 while the high-voltage terminals of unit No. 2 are short-circuited. Then the high-voltage windings of unit No. 2 can be temperature tested in the same way as in Fig. 14. On the low-voltage side, the corresponding line terminals of the two units are interconnected, and each delta circuit is closed to obtain points 40 and 50 of equal alternating current potential, which are connected through conductors 337 and 338 to a low voltage direct current bridge circuit for a direct current temperature test similar to that made on the high voltage windings of Fig. 6. The conductors 339 and 340 lead from points 20 and 30 to a high voltage bridge circuit for measuring the temperature of the high voltage windings. Note also that two circuit breaker poles of each unit, while only phase current passes through the third pole. Namely poles 328 and 329 of unit 1 and poles 332 and 333 of unit 2 carry line currents, while poles 327 and 331 of the two units carry only phase current. This condition will insure proper breaker operation if the three circuit breaker contacts are mechanically interconnected, so that they will trip at the same time.

For a corresponding simultaneous test of two single-phase transformers with low voltage circuit breakers, the low voltage windings may be connected as shown in Fig. 4, in order to insure interruption of all load current by tripping the load current to either transformer.

The application of the invention has been described with respect to the electric windings of a transformer. It will be understood, however, that the principle may be applied generally for temperature testing electric windings in accordance with changes in the resistance of the windings, which windings are connected in a network and energized with load current, the network being so arranged as to provide two points of substantially equal potential in the alternating current network circuit. A direct current bridge may be connected between these equal potential points for measuring the temperature of the network windings. The invention has application to such apparatus as transformers, reactors, electromagnets, rotating electric machinery and other devices having electric windings.

It will be appreciated, therefore, that the illustrations and descriptions of various circuits for applying the invention are to be considered in an illustrative sense rather than in a limiting sense, and I do not wish to be limited otherwise than in accordance with the accompanying claims.

I claim as my invention:

1. The method of measuring the temperature of the windings of an electrical apparatus having two windings inductively related to each other and connected to be energized from a source of alternating current supply for causing load current to flow therethrough, comprising connecting the apparatus winding the temperature of which is to be measured in a closed circuit arranged to provide two points thereof having the same alternating current potential, connecting the two points to a direct current bridge circuit for measuring the winding resistances of the winding paths between the two points in parallel, applying a direct current potential between the two points of the closed circuit of the apparatus winding connected to the bridge circuit, and measuring the temperature of the apparatus winding in the closed circuit by means of the bridge circuit while alternating current is flowing therethrough.

2. The method of measuring the temperature of a winding of an electrical transformer having two inductively related windings, comprising connecting together the two ends of the winding the temperature of which is to be measured to form a short-circuited loop circuit of that winding, connecting the two halves of the winding in parallel circuit relation between the mid-point of the winding and the two ends thereof and connecting these two halves of the winding to a direct current bridge circuit, connecting the other one of the two transformer windings to a controlled source of alternating current potential for energizing the short-circuited winding to cause predetermined load current to flow therethrough, applying a direct current potential to the bridge circuit, and measuring by means of the bridge circuit the temperature of the winding in the short-circuited winding while alternating current is flowing therethrough.

3. The method of measuring the temperature of the windings of two similar units of single-phase electrical transformers having inductively related primary and secondary windings, comprising connecting the primary windings of the two units in series circuit relation with each other in a primary transformer winding circuit and connecting the secondary windings of the two units in series circuit relation with each other in a secondary transformer winding circuit, connecting together the two ends of one of said two transformer winding circuits, the temperature of which is to be measured, to form a short-circuited loop arranged to provide two points thereof having the same alternating current potential, connecting the two points of this loop circuit to a direct current bridge circuit, connecting the other one of the two transformer winding circuits to a source of alternating current potential for energizing the short-circuited loop circuit to cause load current to flow therethrough, applying a direct current potential to the bridge circuit and measuring the temperature of the windings in the short-circuited loop while the alternating current is flowing therethrough.

4. The method of measuring the temperature of the windings of two similar units of single-phase electrical transformers having inductively related high-voltage and low-voltage windings, comprising connecting the high-voltage windings of the two similar units in series circuit relation with each other in a closed short-circuited high-voltage transformer winding circuit, connecting the low-voltage windings of the two units in parallel circuit relation and to a source of alternating current potential for energizing the windings to cause load current to flow therethrough, connecting the terminals of the high-voltage windings to a high-voltage bridge circuit for measuring the resistance of the high-voltage circuit, connecting the mid-points of the low-voltage windings to a low-voltage bridge circuit for measuring the resistance of the low-voltage circuit, applying direct current potentials to the two bridge circuits and simultaneously resistance measuring the temperatures of the high-voltage windings and the low-voltage windings by means of instruments in the bridge circuits while alternating current is flowing through the winding circuits.

5. The method of measuring the temperature of the windings of two similar units of single-phase electrical transformers having inductively related high-voltage and low-voltage windings, comprising connecting the high-voltage windings of the two similar units in series circuit relation with each other in a closed short-circuited high-voltage transformer winding circuit, connecting the low-voltage windings of the two units in parallel circuit relation and to a source of alternating current potential for energizing the windings to cause load current to flow therethrough, connecting the high-voltage winding circuit to a high-voltage alternating current line voltage, connecting two points of the high-voltage winding circuit having the same alternating current potential to the terminals of a high-voltage bridge circuit for measuring the resistance of the high-voltage circuit, connecting two points of the low-voltage winding circuit having the same alternating current potential to the terminals of a low-voltage bridge circuit, applying direct current potentials to the two bridge circuits and simultaneously resistance measuring the temperatures of the high-voltage windings and low-voltage windings by means of instruments in the bridge circuits while alternating load current excitation and alternating line voltage excitation are applied to the windings.

6. The method of measuring the temperature of the windings of three phase electrical transformers having a set of three high-voltage phase windings and a set of three low-voltage phase windings, the high-voltage windings and the low-voltage windings of corresponding phases being inductively related to each other, comprising connecting the three phase windings of one set of windings in a closed circuit arranged to provide two points at the terminals of at least two of the phase windings having the same alternating current potential, connecting the three phase windings of the other set of windings together and to a source of alternating current supply for energizing the windings for causing load current to flow therethrough, applying a direct current potential from a bridge circuit between the two above-named equipotential points of the closed circuit of the set of three phase windings connected to the bridge circuit, and measuring the temperature of the windings by means of the bridge circuit while alternating current is flowing therethrough.

7. The method of measuring the temperature of the windings of three phase electrical transformers having inductively related high-voltage and low-voltage phase windings, comprising connecting the high-voltage phase windings together in a closed circuit having two equipotential points with respect to the alternating current flowing in the circuit at terminals of at least two of the high-voltage phase windings, connecting the two equipotential points to a direct current bridge circuit for measuring the resistance of the windings connected between the two equipotential points, connecting the low-voltage phase windings together and to a source of alternating current supply for energizing the windings for causing load current to flow therethrough, applying a direct current potential between two equipotential points of the closed circuit connected to the bridge circuit, and measuring the temperature of the high-voltage windings by means of the bridge circuit while alternating current is flowing therethrough.

8. The method of measuring the temperature of the windings of three phase electrical transformers having a set of high-voltage phase windings and a set of low-voltage phase windings with the windings of the corresponding phases of the two sets inductively related to each other, comprising connecting the phase windings of one set to be temperature tested in a closed circuit network providing two points thereof having the same alternating current potential, connecting the two points to a direct current bridge circuit for measuring the winding resistances of the winding paths between the two points, connecting the phase windings of the remaining set of windings in a network, connecting one of the two networks to a source of alternating current supply for causing load current to flow therethrough, connecting one of the two networks to a source of alternating current supply for energizing the windings in accordance with line voltage, applying a direct current potential between the two points of the windings being temperature tested having the same alternating current potential, and measuring the temperature of the windings by means of the bridge circuit while alternating load current and alternating current line voltage is applied to the winding.

9. The method of measuring the temperature of the windings of two similar units of three phase electrical transformers having a set of high-voltage phase windings and a set of low-voltage phase windings with the windings of the corresponding phases of the two sets inductively related to each other, comprising connecting the corresponding sets of phase windings of the two similar transformer units to be temperature tested in a closed circuit network providing two points thereof having the same alternating current potential, connecting the two points to a direct current bridge circuit for measuring the winding resistances of the winding paths between the two points, connecting the phase windings of the remaining corresponding sets of the two similar transformer units in a closed circuit network, connecting the last named network to a source of alternating current supply for causing load current to flow therethrough and to a source of alternating current for supplying normal line voltage thereto, applying a direct current potential between the two points of the windings being temperature tested having the same alternating current potential, and measuring the temperature of the windings by means of the bridge circuit while alternating current load current and alternating current line voltage are applied to the windings.

10. The method of simultaneously measuring the temperatures of the high-voltage windings and low-voltage windings of two similar three-phase electrical transformer units, each having a set of high-voltage phase windings and a set of low-voltage phase windings with the windings of the corresponding phases of the two sets inductively related to each other, each unit being provided with a three pole circuit breaker in the low voltage side thereof that is responsive to the current flow therethrough for operating the circuit breaker to interrupt the flow of current therethrough, comprising connecting the phase windings of one of the sets of the two similar transformer units to be measured in closed delta circuit network providing two points thereof having the same alternating current potential, the network including the two circuit breakers so connected in the network circuit that the flow of current through the network is interrupted upon the tripping of either circuit breaker, connecting the two equipotential points to a direct current bridge circuit for measuring the winding resistances of the winding paths between the two points, connecting the remaining set of phase windings of one of the two similar transformer units in Y relation and to a three phase source of alternating current supply for causing load current to flow therethrough, connecting the remaining set of phase windings of the other of the two similar transformer units in parallel relation between two points having the same alternating current potential, applying a direct current potential between the two points of the windings being measured having the same alternating current potential, and measuring the temperature of the two sets of windings by means of the two bridge circuits while alternating load current is applied to the windings.

11. The method of simultaneously measuring the temperatures of the high-voltage windings and low-voltage windings of two similar three-phase electrical transformer units, each having a set of high-voltage phase windings and a set of low-voltage phase windings with the windings of the corresponding phases of the two sets inductively related to each other, each unit being provided with a three pole circuit breaker in the low voltage side thereof that is responsive to the current flow therethrough for operating the circuit breaker to interrupt the flow of current therethrough, comprising connecting the phase windings of one of the sets of the two similar transformer units to be measured in a closed circuit network providing two points thereof having the same alternating current potential, the network including the two circuit breakers so connected in the network circuit that the flow of current through the network is interrupted upon the tripping of either circuit breaker, connecting the two equipotential points to a direct current bridge circuit for measuring the winding resistances of the winding paths between the two points, connecting the remaining set of phase windings of one of the two similar transformer units to a three phase source of alternating current supply for causing load current to flow therethrough, connecting the remaining set of phase windings of the other of the two similar transformer units in a network circuit between two points having the same alternating current potential, applying a direct current potential between the two points of the windings being measured having the same alternating current potential, and measuring the temperature of the two sets of windings by means of the two bridge circuits while alternating load current is applied to the windings.

12. The method of simultaneously measuring the temperatures of the high-voltage windings and low-voltage windings of two similar three-phase electrical transformer units, each having a set of high-voltage phase windings and a set of low-voltage phase windings with the windings of the corresponding phases of the two sets inductively related to each other, each unit being provided with a three pole circuit breaker in the low voltage side thereof that is responsive to the current flow therethrough for operating the circuit breaker to interrupt the flow of current therethrough, comprising connecting the phase windings of one of the sets of the two similar transformer units to be measured in a closed circuit network providing two points thereof having the same alternating current potential, the network including the two circuit breakers so connected in the network circuit that the flow of current through the network is interrupted upon the tripping of either circuit breaker, connecting the two equipotential points to a direct current bridge circuit for measuring the winding resistances of the winding paths between the two points, connecting the remaining set of phase windings of one of the two similar transformer units in Y relation and to a three phase source of alternating current supply for causing load current to flow therethrough, and measuring the temperature of the windings by means of the bridge circuit while alternating load current is applied to the windings.

13. The method of simultaneously measuring the temperatures of the high-voltage windings and low-voltage windings of two similar electrical transformer units, each having a set of high-voltage windings and a set of low-voltage windings inductively related to each other, each unit being provided with a circuit breaker in the low voltage side thereof that is responsive to the current flow therethrough for operating the circuit breaker to interrupt the flow of current therethrough, comprising connecting the low voltage windings of one of the sets of the two similar transformer units to be measured in a closed circuit network providing two points thereof having the same alternating current potential, the network including the two circuit breakers so connected in the network circuit that the flow of current through the network is interrupted upon the tripping of either circuit breaker, connecting the two equipotential points to a direct current bridge circuit for measuring the winding resistances of the winding paths between the two equipotential points, connecting the remaining set of windings of the two similar transformer units in a closed circuit network provided with two points thereof having the same alternating current potential and to a source of alternating current supply for causing load current to flow therethrough, and measuring the temperatures of the two sets of windings by means of the two bridge circuits while alternating load current is applied to the windings.

14. The method of simultaneously measuring the temperatures of the high-voltage windings and low-voltage windings of two similar electrical transformer units, each having a set of high-voltage windings and a set of low-voltage windings with the windings of the corresponding units inductively related to each other, each unit being provided with a circuit breaker in the low voltage side thereof that is responsive to the current flow therethrough for operating the circuit breaker to interrupt the flow of current therethrough, comprising connecting the low-voltage windings of one of the sets of the two similar transformer units to be measured in a closed circuit network providing two points thereof having the same alternating current potential, the network including the two circuit breakers so connected in the network circuit that the flow of current through the network is interrupted upon the tripping of either circuit breaker, connecting the two equipotential points to a direct current bridge circuit for measuring the winding resistances of the winding paths between the two points, connecting the remaining set of windings of the two similar transformer units to a source of alternating current supply for causing load current to flow therethrough, and measuring the temperature of the windings by means of the bridge circuit while alternating load current is applied to the windings.

GERHARD M. STEIN.

REFERENCES CITED

The following references are of record in the file of this patent:

UNITED STATES PATENTS

| Number | Name | Date |
|---|---|---|
| 2,435,070 | Camilli | Jan. 27, 1948 |
| 2,450,269 | Chabrol | Sept. 28, 1948 |